Patented Nov. 6, 1928.

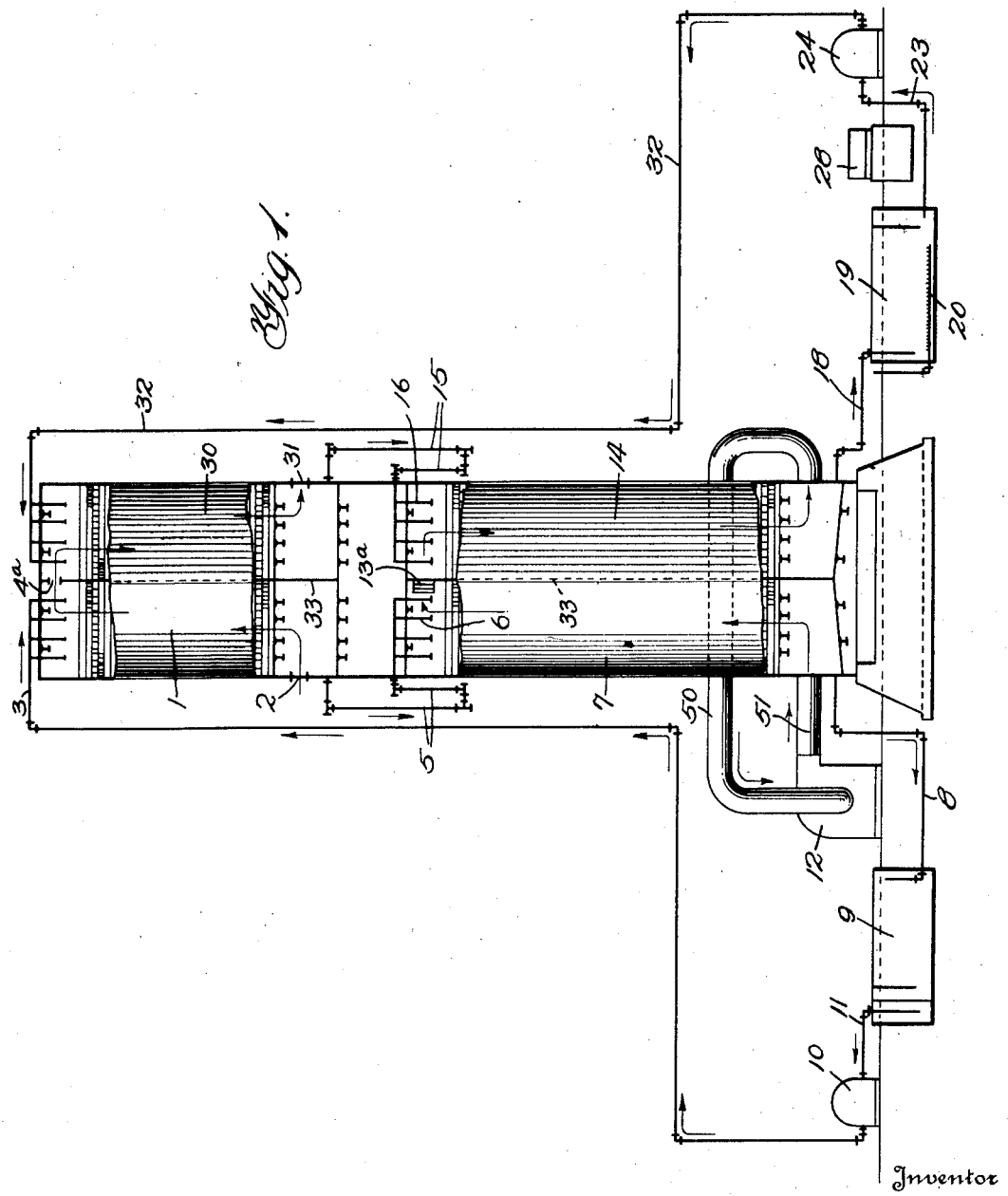

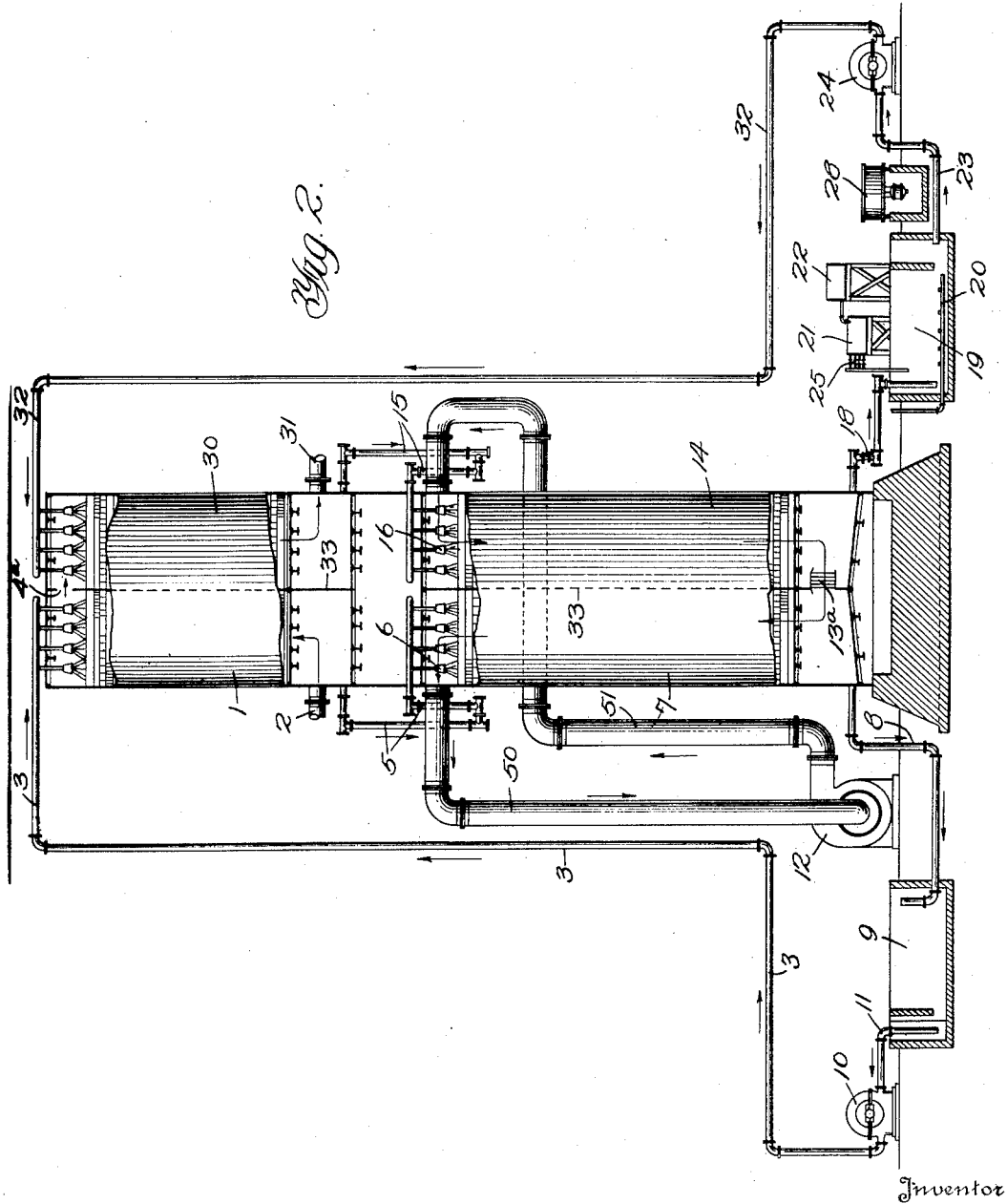

1,690,438

UNITED STATES PATENT OFFICE.

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA.

RECIRCULATING PROCESS AND APPARATUS FOR GAS PURIFICATION.

Application filed June 6, 1924, Serial No. 718,255. Renewed January 23, 1928.

This invention relates to processes and apparatus for the purification of gases, of the kind involving the steps of transferring the impurities to a stream of air and purifying the air with a washing liquid which may incidentally be regenerated by the air with separation of the impurities in easily recoverable form.

The invention is more particularly applicable to the elimination of hydrogen sulphide from coal gas and like fuel gases as described in my application filed of even date herewith, Ser. Nos. 718,253, filed June 6, 1924 and 718,254, filed June 6, 1924 and the application of Gilbert Edward Seil, Ser. No. 718,204, filed June 6, 1924 also filed of even date herewith.

The invention consists broadly in recirculating the air from which the impurities have been removed back to the gas purification stage. By this operation the discharge into the atmosphere of any material that might cause odor is substantially avoided, because the air employed in the process circulates in a closed path with the exception of losses due to leakage and the absorptions of oxygen in the chemical reactions of the process, which losses are compensated by adding fresh air to the system to the extent found necessary.

The invention also consists in providing apparatus for carrying out the new process, comprising means for transferring impurities from the gas to a stream of air, in combination with a scrubber for purifying the air, connections which unite in a closed circuit the air scrubber and the chamber in which the air takes up the impurities extracted from the gas, and a device for circulating the air through said circuit.

The invention further consists in such other new and useful improvements, and has for further objects such other operative advantages or results, as may be found to obtain in the processes and apparatus hereinafter described or claimed.

In order that the invention may be understood, there will now be described by way of example and with reference to the accompanying drawings, a preferred mode of carrying out the process and two arrangements of apparatus with which the process may be carried out, as applied to the elimination of hydrogen sulphide from coal gas.

In these drawings:

Figure 1 is a general elevational view of a complete plant for the elimination of hydrogen sulphide from coal gas, with circulation of air through the actifier by pressure.

Figure 2 is a similar view of a plant with circulation of air through the actifier by suction.

In both figures of these drawings similar reference numerals refer to corresponding parts.

In the specific instance now to be described, coal gas is purified from hydrogen sulphide and other acid impurities employing the special features described in the aforesaid applications filed of even date herewith, to wit, uni-directional flow of air and air washing liquid in the air scrubber, secondary washing of the gas with freshly regenerated air washing liquid to remove the last traces of hydrogen sulphide, and arrangement of all the devices in a single tower.

The first washing, by which about 90% of the $H_2S$ is removed, is effected in the primary absorber or scrubber 1 at the top of the left hand section of the single tower, with a solution of sodium carbonate. The gas enters the absorber 1 by the inlet 2, flows upwards in countercurrent with the solution delivered through a pipe 3, and then passes through an opening $4^a$ in partition 33 which divides the tower longitudinally, into the top of the secondary absorber 30 located at the upper right hand side of the partition 33. In the secondary absorber the gas is washed with a freshly regenerated alkaline solution containing suitable iron compound, preferably freshly precipitated in accordance with the invention in my application Ser. No. 718,253 aforesaid, the primary function of which liquid is to purify the air as described hereinafter. The liquid has a great avidity for hydrogen sulphide and is extremely effective in absorbing the last traces of the same from the gas in the secondary absorber 30. The gas flows downwards through the absorber 30 and is discharged through the outlet 31.

The sodium carbonate solution flows from the bottom of the primary absorber 1 through pipes 5 into the top of the actifier 7 which is located immediately underneath the absorber 1. The solution falls through the actifier to the bottom thereof and flows off through a pipe 8 into a sump 9 from which it is withdrawn by a pump 10 and pipe 11 and thence recirculated to the top of the absorber 1. The solution flows in countercurrent in the actifier 7 with a stream of air supplied by a blower 12 whereby the alkaline solution is regenerated and the hydrogen sulphide transferred to the air. The air from the top of the actifier 7 passes into the top of an air scrubber 14 located directly below the secondary absorber 30, through an opening 13$^a$ in the partition 33 equipped with a baffle to prevent entrainment of the actifier solution into the air scrubber. In the air scrubber the air is washed with the liquid containing the iron compound which has already functioned in the secondary absorber 30 and which, because of the comparatively small amount of $H_2S$ which it has absorbed therein, has suffered no appreciable deterioration of its air purifying qualities. This washing liquid, as well as the air, is introduced at the top of the scrubber 14, and through pipes 15 and sprayers 16, and after traversing the scrubber downwardly, that is, in the same direction as the air, the liquid flows off through a pipe 18 into a sump 19. The liquid is regenerated concurrently with the purification of the air while traversing the scrubber 14 and the regeneration is completed in the sump by means of air jets 20 which also agitate the liquid and mechanically float the sulphur to the surface thereof from which it is readily removed by skimming and dried in the centrifuge 28. The air washing liquid is pumped from the sump 19 by the pump 24 and through pipes 23, 32, and sprayers, to the top of the secondary absorber 30 wherein it functions in the manner previously described.

According to the present invention the air which has been purified in the air scrubber 14 is not discharged into the atmosphere but is led back to the actifier chamber and utilized therein for aerating further quantities of sodium carbonate solution. The air thus circulates in a closed path and traverses alternately the air scrubber 14 and the actifier 7 so that there is substantial avoidance of discharging into the atmosphere anything that might cause odor. Fresh air is added to the circulation as found necessary to replace losses of air by leakage and absorption of oxygen in the chemical reactions involved in the process.

In the plant shown in Fig. 1, the air is circulated by a blower 12 having its connections 50 and 51 to the lower ends of the air scrubber 14 and actifier 7 respectively. The air circulates through the closed circuit comprising the blower 12, actifier 7, scrubber 14 and connections 50, 51 in the direction shown by the arrows, the pressure connection from the blower leading to the actifier.

In the plant shown in Fig. 2, which is the preferred arrangement, a blower is used and the connections 50, 51 are joined to the upper ends of the actifier 7 and air scrubber 14 respectively. The air traverses the partition 33 near the bottom through the opening 13$^a$ provided with solution baffles, and circulates in the path indicated by arrows, the suction connection to the blower leading from the actifier.

In this figure the feed tanks 21, 22 for the formation of freshly precipitated iron compound in accordance with the invention claimed in my aforesaid application, Ser. No. 718,253 are shown.

In the plants illustrated in Figs. 1 and 2, or in any plant for carrying out the invention, the air jets 20 for agitating the liquid can be replaced, if desired, by the porous plate device described in said last mentioned application.

The invention as hereinabove set forth or exemplified may be variously practiced or embodied within the scope of the claims hereinafter made.

I claim:

1. A process of the kind referred to for the purification of gases involving the steps of washing gas with a liquor to absorb impurities, aerating such wash liquor to regenerate the same and washing the air to remove the impurities, characterized by recirculating the air from which the impurities have been removed back to the liquid regeneration stage.

2. A process for the purification of gases comprising the steps of washing the gas with an impurity absorbing liquid, aerating the liquid to regenerate the same and transfer the impurities to a stream of air, washing the air with an impurity absorbing liquid with concurrent regeneration of the liquid, and circulating the air in a closed path alternately through the aeration and the air washing stages.

3. A process as claimed in claim 2, in which the gas is subjected to a second washing effected with freshly regenerated air washing liquid prior to the entry of said liquid into the air purification stage.

4. A process as claimed in claim 2, in which the circulation of the air through the actifier is effected by suction.

5. A process as claimed in claim 2, in which the circulation of the air through the actifier is effected by pressure.

6. A process as claimed in claim 1, in which the air purification stage is effected with unidirectional movement of the air and the washing liquid for same.

7. A process as claimed in claim 1, applied to the elimination of hydrogen sulphide from coal gas and like fuel gases.

8. A process as claimed in claim 1, applied to the elimination of hydrogen sulphide from coal gas and like fuel gases and in which the air purification is effected with a washing liquid containing a freshly precipitated iron compound.

9. Apparatus for carrying out the process of claim 1 comprising means for transferring impurities from the gas to a stream of air, in combination with a scrubber for purifying the air, connections which unite in a closed circuit the air scrubber and the chamber in which the air takes up the impurities extracted from the gas, and a device for circulating the air through said circuit.

10. Apparatus as claimed in claim 9 comprising two towers in one of which are located in superposition a primary absorber and an actifier for the gas washing liquid used in said absorber, and in the other of which are similarly located a secondary absorber and the air scrubber, the primary and secondary absorbers being so connected that the gas to be purified traverses them in series, and the actifier and air scrubber being so connected that the air circulates in a closed path through them in alternation.

11. Apparatus as claimed in claim 9 comprising two chambers in one of which chambers are located the primary absorber and actifier for the gas washing liquid used in said absorber, while in the other chamber are located the secondary absorber and the air scrubber, the primary and secondary absorbers being so connected that the gas to be purified traverses them in series, and the actifier and air scrubber being so connected that the air circulates in a closed path through them in alternation.

In testimony whereof I have hereunto set my hand.

FREDERICK W. SPERR, Jr.